Jan. 4, 1955 A. B. SOWTER 2,698,548
METHOD OF PRESSURE WELDING
Filed Feb. 27, 1951
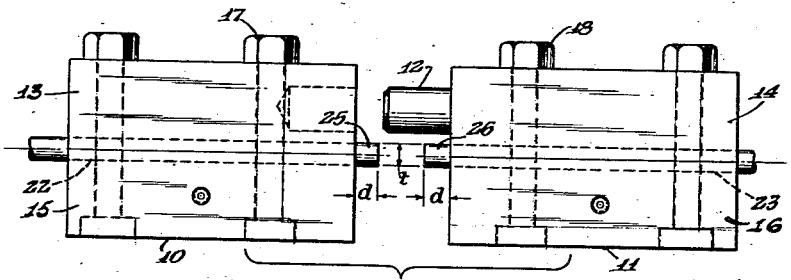
FIG. 1.
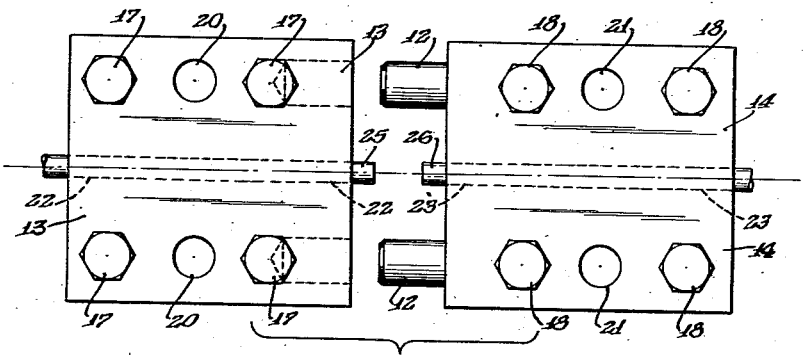
FIG. 2.
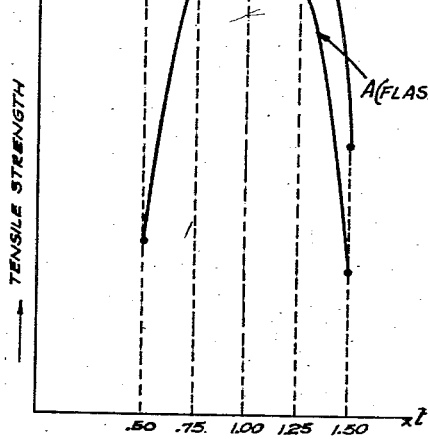
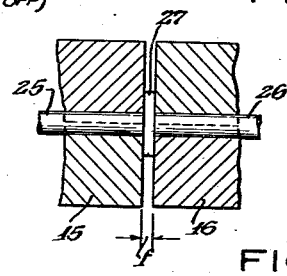
FIG. 3.
FIG. 4.
FIG. 5. → PROJECTION d IN TERMS OF ROD DIAMETER
INVENTOR
ANTHONY BAGNOLD SOWTER
BY
ATTORNEY

United States Patent Office 2,698,548
Patented Jan. 4, 1955

2,698,548

METHOD OF PRESSURE WELDING

Anthony Bagnold Sowter, Wembley, England, assignor to The General Electric Company Limited, London, England Application February 27, 1951, Serial No. 212,893

Claims priority, application Great Britain October 31, 1950

2 Claims. (Cl. 78—92)

My invention relates to cold pressure welding, that is to say, the welding together of metallic members by the application of sufficient pressure to cause the flow of metal into welding contact, substantially without the supply of any extraneous heat.

Various proposals have been made in the past for welding members together by one or more lap welds, using cold pressure welding, such as described in detail in my U. S. Patent No. 2,522,408, entitled Cold Pressure Welding, and issued September 12, 1950.

The present invention describes a new method and means, whereby two members, such as rods, wires or the like, can be butt welded together using the pressure welding process, as distinguished from either flame or electric heat welding in which, when the abutting surfaces are sufficiently heated, the metal is upset and welding takes place.

An object of the present invention is therefore the provision of means for and a method of butt welding together a pair of metal members, using pressure to cause the metals of the members to be welded to flow into intimate contact, to form a solid phase butt weld joint.

The invention is, however, not restricted to cold pressure welding at normal or room temperatures and may be used in connection with pressure welding processes, where some heat is applied to the members to be welded and where welding is effected essentially as a result of the pressure-induced plastic flow of the metal of the adjoining surfaces of the members to be welded together. The additional heat may be supplied to the members by heating the pressure welding tools, or the members may be preheated in any suitable manner before insertion between the welding tools.

With the above general object of the invention in view, a method of cold pressure welding together two members of cold weldable metal in a butt joint comprises essentially holding or clamping each member close to but not right up to that end which is to be joined to the other member, in such a manner as to contain and prevent lateral distortion of the members, but to allow some lateral flow of the metal of the members at the joint, and forcing the members together by applying pressure across the joint through the members themselves, to thereby cause the metal of the abutting surfaces of both members to flow out laterally and into intimate welding contact and, in so doing, to effectively weld the members together by a solid phase butt weld joint or bond.

That portion of a member which projects beyond its holding or containing means, should be of such length that it is rigid enough and does not bend or crumple under the applied pressure and that the tool members cause the upset metal to flow substantially radially outwardly. It is important, however, that the length of the projecting portion should be greater than a certain minimum, this minimum depending upon the physical dimensions and material of the members to be welded together.

Thus, in butt welding together two ¼″ diameter electrical purity aluminum rods, a free or projecting length of say ⅟₁₆″ has been found to be unsatisfactory, while a projecting length of about ³⁄₁₆″ or over is quite satisfactory. In general, it has been found that, providing the projecting length is not much less than the diameter or gauge thickness of the material and pressure is applied until the effective projection is reduced to about one-quarter of its original length, welding occurs and good butt weld joints are obtained.

In butt welding two wires, rods or other members together, the ends to be joined are first cleaned, preferably by scratch-brushing, after the members have been cut at right angles to their lengths, to remove oxide or other surface contamination and matter foreign to the metal of said members. The members are then held in welding tool members or clamps which may consist of two-piece blocks. In the case of welding rods or wires, each clamp may have a bore shared by each block which is of diameter slightly less than that of the wire, to insure a firm hold or grip of the rods or wires by the clamp. The clamps are then brought together in a suitable press to a predetermined stop, to effect a butt welding of the areas, as will become more apparent from the following.

The invention will be better understood from the following detailed description of a practical example thereof, taken in connection with the accompanying drawing, forming part of this specification and wherein:

Figure 1 shows a side view of a tool assembly for holding a pair of rods or other work pieces during welding;

Figure 2 is a plan view of the tools shown in Figure 1;

Figure 3 is a fractional view showing the work in place at the start of welding;

Figure 4 is another view similar to Figure 3, showing the work when welding has been completed; and Figure 5 is a graph illustrating the results obtained with cold pressure butt welding employing the principles of the invention.

According to a specific example described in the following, two rods of ¼″ diameter electrical purity aluminum were butt welded together and, before placing in the tools, the ends to be welded together were cut flat at right angles to the lengths of the rods and cleaned, as by mechanical scratch-brushing, to ensure that there was no thick layer of oxide or other foreign matter on the surfaces of the ends.

Referring more particularly to Figures 1 and 2 of the drawing, the tools shown for holding the rods consist of two somewhat similar clamps or tool members 10 and 11, the member 11 having dowels 12 which engage in holes in the tool member 10, to ensure that the tools remain aligned correctly at welding. Both tool members 10 and 11 comprise upper parts 13 and 14 and lower parts 15 and 16, respectively, the cooperating parts 13, 15 and 14, 16 being arranged to be clamped securely together by bolts 17 or 18, dowels 20 or 21 in the upper parts 13 and 14 engaging suitable holes in the lower parts 15 and 16, respectively, to ensure proper guidance and alignment of the tools during welding.

Each clamp or tool member 10 or 11 is furthermore provided with a central bore 22 or 23, respectively, which is half in one part and half in the other, the diameter of said bores being slightly less than the diameter of the rods 25 and 26 to be welded together. Actually, the diameter of the hole or bore in each tool member was made 0.219″ for rods of ¼″ diameter to be welded. The reason for making the holes or bores 22 and 23 undersize is to ensure that when the rods 25 and 26 are clamped in the tool members 10 and 11, they cannot slide longitudinally and thus allow the requisite pressure to be applied across the ends of the tool members and in turn to the abutting faces or ends of the rods or other members to be welded together.

If desired, the surface of the holes or bores 22 and 23 may be grooved, serrated or otherwise constructed to increase the friction and to firmly grip the rods 25 and 26 with a minimum of clamping pressure. Alternatively or additionally, the inner parts of the bores 22 and 23 may be curved and the rods or wires 25 and 26 bent to conform to the same shape, to increase the friction and prevent or reduce slippage under the effect of the applied welding pressure.

Referring to Figure 3, when welding is to be effected, each rod 25 and 26 is clamped in its own tool member and projects by a distance d of about ³⁄₁₆″ from the face of the tool member. The tool members 10 and 11, with the rods 25 and 26 in position as shown in the drawing, are placed in a press and the two tool members forced together, as indicated by the arrows a and b in the drawing, to apply pressure across the butt joint.

In the foregoing example, i. e. in butt welding a pair of electrically pure aluminum rods or wire of ¼" diameter, a load of about four tons is placed on the joint and the tool members 10 and 11 moved together until a disc or flash 27, Figure 4, of metal lies between the facing ends of the tool members and welding has been effected. The thickness $t$ of the flash 27 is about 3/32" and its diameter about ½". These dimensions have been found to give a satisfactory weld not only at the center of the disc over the original one-quarter inch rod diameter, but almost out to the periphery of the disc or flash 27. The values given may be varied within limits, as described in greater detail hereafter, to obtain efficient butt weld joints in accordance with the invention.

More specifically, when pressure is first applied, the projecting ends of the rods 25 and 26 commence to bulge radially outwards from their abutting faces right back to the facing ends of the tool members 10 and 11. The tool members cause the metal to flow radially outwards and this flow of metal with the ends of the two rods in close contact effects the weld. Care must be taken not to reduce the final distance $f$ between the tool members 10 and 11 or flash 27 is too small a value, since the closeness of the members 10 and 11 ultimately restricts the radial outward flow of metal and, surprisingly enough, metal will be forced rearwardly down the centers of the rods 25 and 26 in the tool members 10 and 11.

The thickness $f$ of the flash 27 may be determined by a stop associated with the pressure tools, or the surfaces of the tools may be provided with suitable recesses conforming with the size and width of the flash or disc 27 in which case pressure is applied until the tool members engage or abut each other, as will be readily understood.

In a welded joint made as described above, micro-section, a good weld for at least a diameter of 3/8" centered about the longitudinal axis of the two rods 25 and 26. When such a weld is subjected to a pulling test, each rod being held in a clamp and the two rods and weld being placed under tension, it is found that the weld does not fail and that breakage occurs in one of the rods at a point remote from the weld.

The excess metal in the disc 27 radially outwards of the surfaces of the rods 25 and 26 may be trimmed off and the rods may be drawn down, with suitable heat treatment for annealing if necessary, in exactly the same manner as if no weld were present.

Naturally, for other dimensions or sections of aluminum rod, a different projecting length $d$ will be used, as mentioned above and described more clearly in the following. Furthermore, as will be appreciated, the process of butt welding according to the invention can be applied to members other than rods or wires, as well as to metal or alloys other than aluminum and capable of being cold pressure welded. Thus, square rods, strips, plates or sections of tubing may be butt welded together by a process and tools similar or equivalent to those described.

Figure 5 shows a plot or graphic representation of the relation between the initial projection $d$ of the rods or equivalent pieces to be welded from the surface of the welding tools, in terms of gauge thickness or rod diameter, and the tensile strength of the butt weld joint obtained, the final distance between the tool surfaces or thickness $f$ of the disc or flash 27 being equal to about one-quarter the sum of the projections $d$. It is seen that good welds may be obtained over the equivalent range of .5 to 1.5 with respect to the cross-sectional dimension, i. e. the gauge thickness or rod diameter $t$ if the flash is left intact, on the one hand, and over the equivalent range of about .75 and 1.25 with respect to the gauge thickness if the flash is filed or otherwise trimmed off, to obtain a smooth joint of thickness equal to the original wire or gauge thickness $t$.

In case of ¼" aluminum rods butt welded in this manner, it was found that the tensile strength of the joint was equal or greater than the tensile strength of the original material, as evidenced by the fact that, upon subjecting the butt welded rod to a tensile strength measurement in a suitable measuring device, failure occurred away from the joint, thus proving that the joint itself was stronger than the parent rod.

Similar conditions prevail for other grades of aluminum and similar metals capable of being cold pressure welded.

In the foregoing, the invention has been described with reference to a specific illustrative device and method. It will be understood, however, that variations and modifications as well as the substitution of equivalent elements and steps for those shown herein for illustration, may be made in accordance with the broader scope and spirit of the invention as defined by the appended claims. The specification and drawing are accordingly to be regarded in an illustrative rather than in a limiting sense.

I claim:

1. A method of cold butt welding the ends of wires or the like comprising the steps of providing clean uncontaminated flat end faces on said wires at right angles to the axis thereof, placing said end faces in abutting contact and, without the addition of heat, subjecting said wires to endwise pressure axially thereof to force said end faces together and to upset the metal of the wires equally around the interface and radially of the wires, to obtain under heavy pressure an extreme interfacial flow of metal radially of the wires at and in the plane of the interface, and while continuing said pressure and flow compressing the upset metal with forces parallel to the axis of said wires, to flatten the upset so as to create a restriction to said radial flow and to intensify the action at the interface, and continuing said pressure and compressive action until the upset is a multiple of the cross-sectional dimension of the wire or the like and results in a solid phase bond at the interface.

2. A method of cold butt welding the ends of wires or the like comprising the steps of providing clean uncontaminated flat end faces on said wires at right angles to the axis thereof, placing said end faces in abutting contact and, without the addition of heat, subjecting said wires to endwise pressure axially thereof to force said end faces together and to upset the metal of the wires equally around the interface and radially of the wires, to obtain under heavy pressure an extreme interfacial flow of metal radially of the wires at and in the plane of the interface, and while continuing said pressure and flow compressing the upset metal with forces parallel to the axis of said wires, to flatten the upset so as to create a restriction to said radial flow and to intensify the action at the interface, and continuing said pressure application and compressive action until a length of the wire or the like equivalent to its cross-sectional dimension is upset and results in a solid phase bond at the interface.

References Cited in the file of this patent

UNITED STATES PATENTS

| Number | Name | Date |
|---|---|---|
| 199,180 | Bricknell | Jan. 15, 1878 |
| 650,862 | McTighe | June 5, 1900 |
| 731,100 | Dick | June 16, 1903 |
| 2,356,854 | Kirk | Aug. 29, 1944 |
| 2,522,408 | Sowter | Sept. 12, 1950 |